United States Patent [19]

Föhl

[11] 4,423,846
[45] Jan. 3, 1984

[54] RETIGHTENER FOR AUTOMATIC SAFETY BELT ROLL-UP DEVICES

[75] Inventor: Artur Föhl, Schorndorf, Fed. Rep. of Germany

[73] Assignee: Repa Feinstanzwerk GmbH, Alfdorf, Fed. Rep. of Germany

[21] Appl. No.: 307,882

[22] Filed: Oct. 2, 1981

[30] Foreign Application Priority Data

Oct. 6, 1980 [DE] Fed. Rep. of Germany ....... 3037738
Aug. 10, 1981 [DE] Fed. Rep. of Germany ....... 3131637

[51] Int. Cl.$^3$ ................ A62B 35/02; B65H 75/48
[52] U.S. Cl. .................................. 242/107; 280/806
[58] Field of Search .......... 242/107, 107.4 R–107.4 E; 280/806–808; 60/632, 636; 297/477, 478, 480

[56] References Cited

U.S. PATENT DOCUMENTS 3,043,093 7/1962 Stott ........................ 280/806 X
3,871,470 3/1975 Schwanz et al. ........ 242/107.4 R X
4,191,344 3/1980 Tillac ........................... 242/107
4,242,945 1/1981 Tisell et al. ................. 92/27 X
4,258,934 3/1981 Tsuge et al. ............. 297/480 X Primary Examiner—John M. Jillions
Attorney, Agent, or Firm—Herbert L. Lerner; Laurence A. Greenberg

[57] ABSTRACT

Retightener for automatic safety belt roll-up devices with a power reservoir which can be triggered in the case of a crash and with an energy transducer which acts upon the belt shaft of the automatic winder after triggering the power reservoir, causing the automatic winder to perform a rotary retightening motion. A rotatable pulling means pulley is provided as energy transducer which can be coupled to the belt shaft. The pulling means of the pulley is in connection with the power reservoir and effects the coupling connection and a retightening motion of the belt shaft after triggering the power reservoir and after surmounting the holdback force of a holdback device, e.g. shear pins.

50 Claims, 32 Drawing Figures

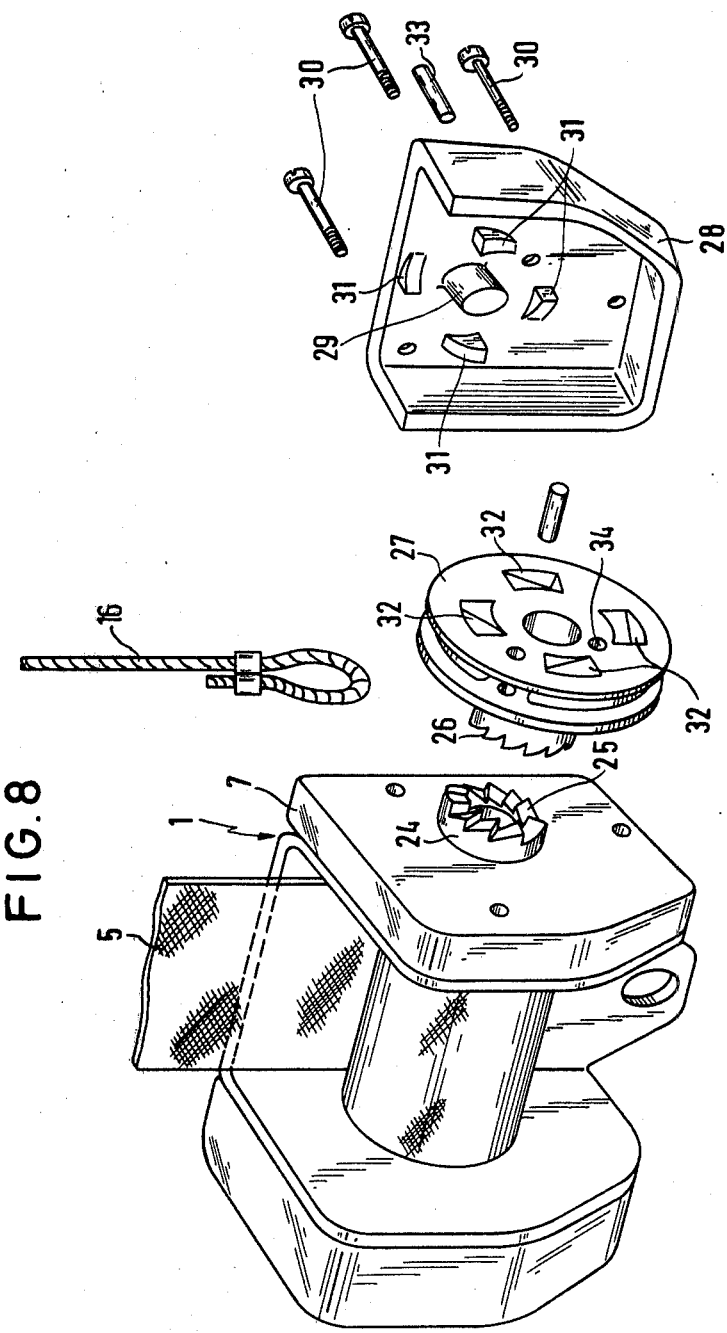

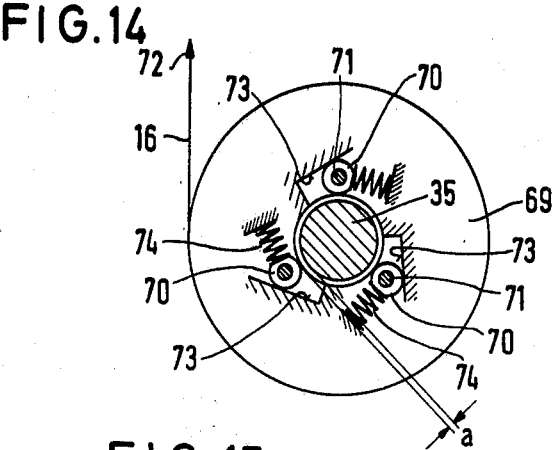
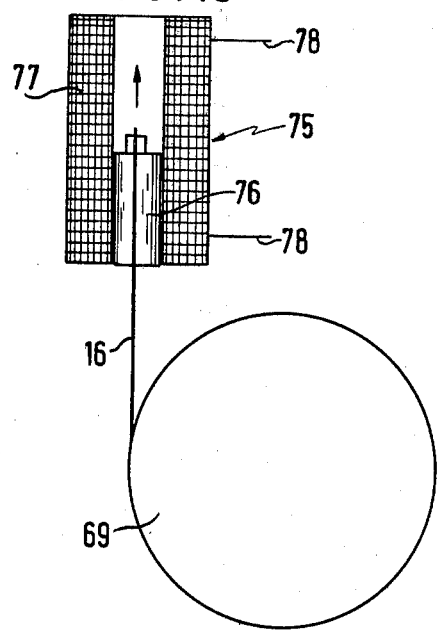
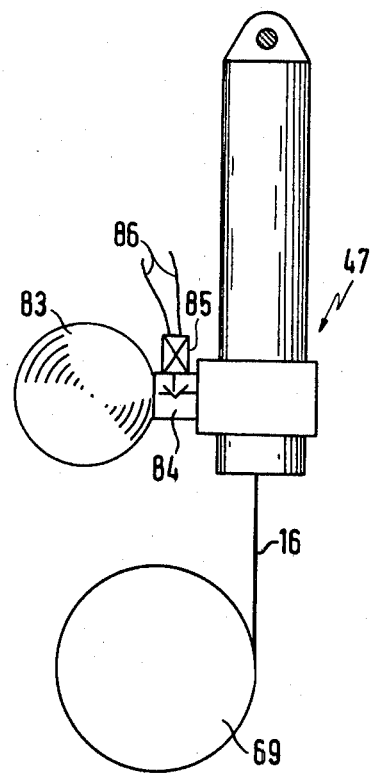
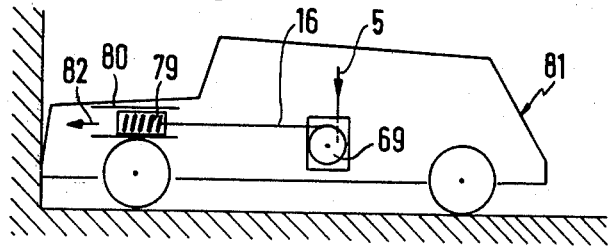

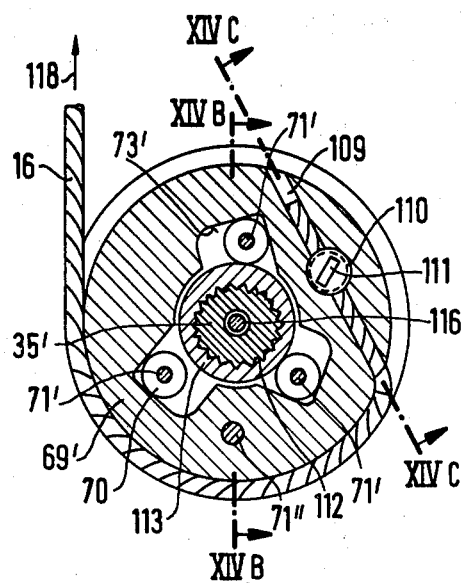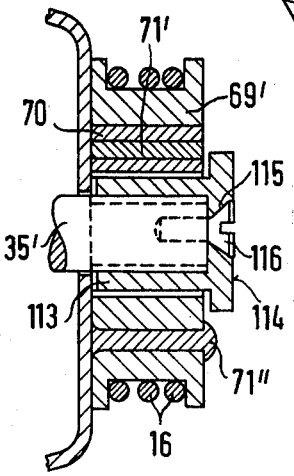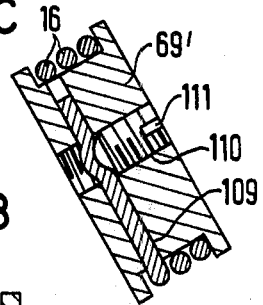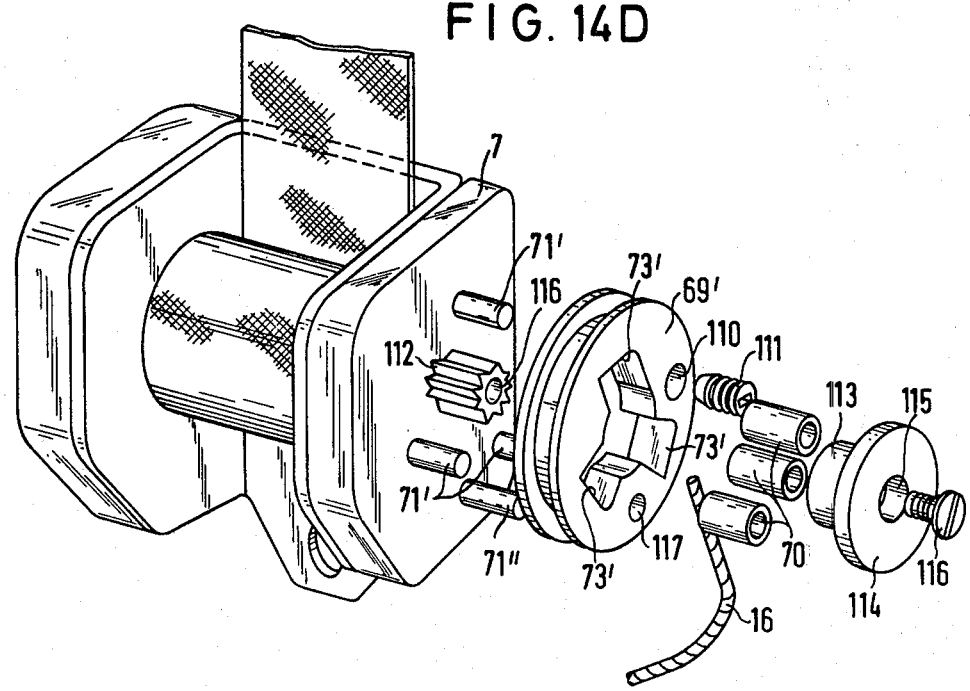

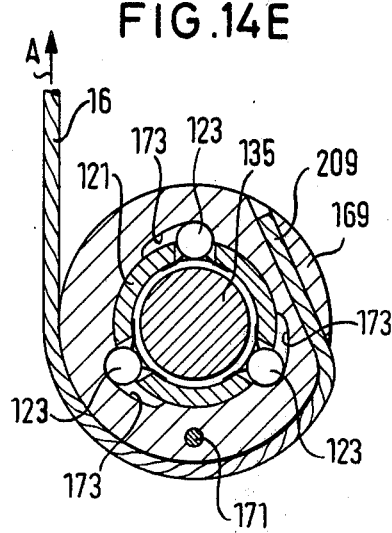
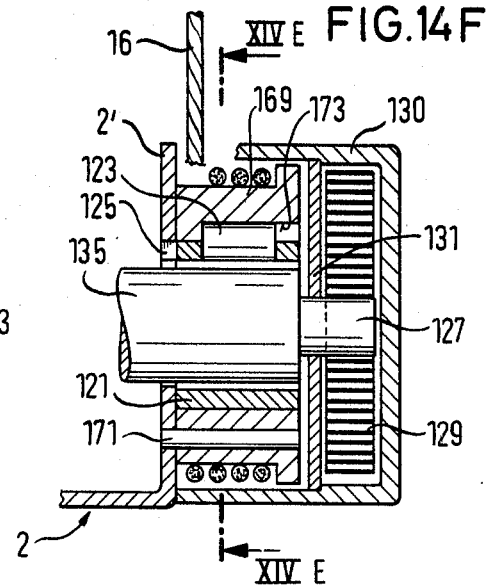
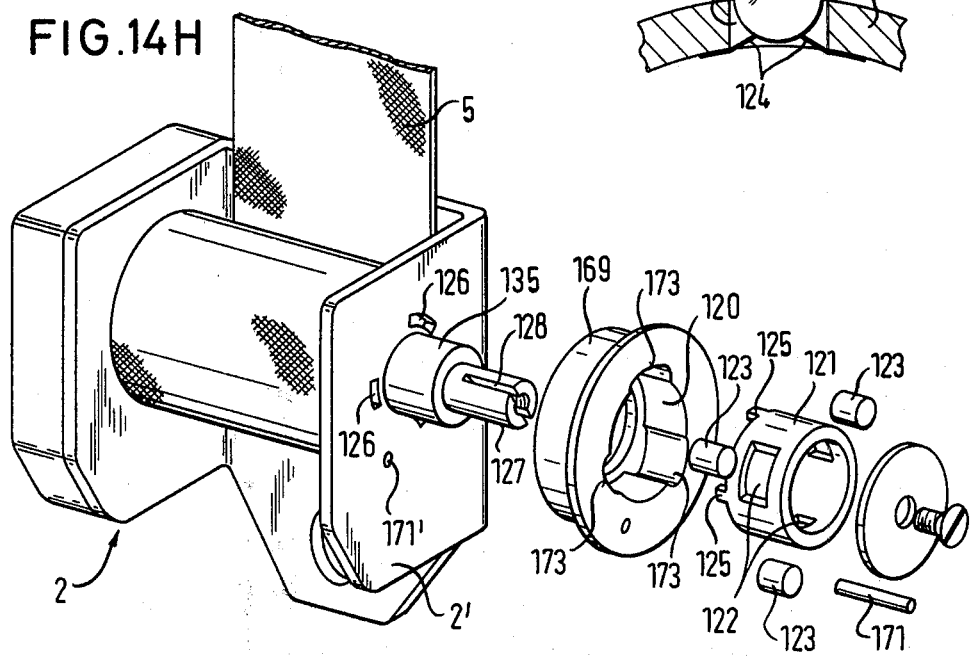

RETIGHTENER FOR AUTOMATIC SAFETY BELT ROLL-UP DEVICES

CROSS-REFERENCE TO RELATED APPLICATION

My application, Ser. No. 307,883, filed on Oct. 2, 1981.

BACKGROUND OF THE INVENTION

1. Field of the Invention

The invention relates to a retightener for automatic safety belt roll-up devices with a power reservoir which can be triggered in case of a crash and with an energy transducer which acts upon the belt shaft of the automatic winder after triggering the power reservoir, causing the automatic winder to perform a rotary retightening motion.

2. Description of the Prior Art

Retighteners of the above kind serve the purpose of eliminating belt clearance in the case of danger, e.e. in the case of a crash, by pulling the belt back so that the belt hugs the body of the person to be secured as closely as possible, thereby keeping the free forward fall distance as short as possible until the safety belt system becomes effective.

It is known to combine designwise with the automatic winder so-called rotation retighteners with which is associated as power reservoir a propellant charge which, when a deceleration exceeding a predetermined amount occurs on the motor vehicle, such as in the case of a crash, is fired automatically, whereby the pressure of the explosion of the pyrotechnical propellant charge drives a turbine wheel mounted on the belt shaft of the automatic winder. In one such known embodiment (German Published Non-Prosecuted Application DE-OS 26 18 119) there is disposed between the propelling charge and the retightening element in the form of a turbine wheel a fluid cushion transmitting the pressure of the propellant charge explosion and representing an energy transducer.

SUMMARY OF THE INVENTION

An object of the invention is to provide a retightener for automatic belt roll-up devices with a power reservoir which can be triggered in case of a crash and with an energy transducer which acts upon the belt shaft of the automatic winder after triggering the power reservoir causing the automatic winder to perform a rotary retightening motion, in a compact form and with low production costs and, in particular, with a high functional efficiency of the retightener.

With the foregoing and other objects in view, there is provided in accordance with the invention a retightener for automatic safety belt roll-up devices with a power reservoir which can be triggered in case of a crash and with an energy transducer which acts upon the belt whaft of the automatic winder after triggering the power reservoir, causing the automatic winder to perform a rotary retightening motion, the improvements comprising wherein said energy transducer is a rotatable pulling means pulley which can be coupled to said belt shaft, said pulley having pulling means in connection with said power reservoir and effect both the coupling connection with the belt shaft and a retightening motion of the belt shaft after triggering the power reservoir, and holdback means to restrain said rotatable pulling means pulley from forming said coupling connection until said power reservoir is triggered.

Other features which are considered as characteristic for the invention are set forth in the appended claims.

Although the invention is illustrated and described herein as embodied in a retightener for automatic safety belt roll-up device it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIGS. 1-4 show a first embodiment of the retightener according to the invention in which FIG. 1 is a side view, FIG. 2 is a front view, FIG. 3 is a perspective view and FIG. 4 is an exploded view, FIGS. 5-8 illustrates a second embodiment of the retightener according to the invention in side view, front view, perspective view and exploded view, respectively, FIG. 14 is a schematically shown variant of the coupling principle for the coupling connection between pulling means pulley and belt shaft, FIGS. 14A-14D is an embodiment of the principle according to FIG. 14 in sectional views and in exploded view, FIGS. 14E-14H is another embodiment of the principle according to FIG. 14 in top view, sectioned side view, sectioned detail view and exploded view, FIGS. 15-17 show three different variants of power reservoirs, designed as electromagnet in FIG. 15, as mass shiftable in the vehicle in FIG. 16, and as pressure reservoir in FIG. 17.

DETAILED DESCRIPTION OF THE INVENTION

Figure 1:
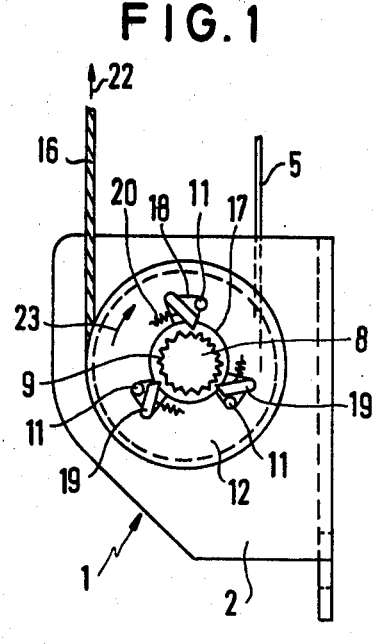

In accordance with the invention, a rotatable pulling means pulley is provided as an energy transducer which can be coupled to the belt shaft. The pulling means of the pulley is in connection with the power reservoir and effects the coupling connection and a retightening motion of the belt shaft after triggering the power reservoir and after surmounting the holdback forces of a holdback device, e.g. shear pins.

The power reservoir's kinetic energy has two jobs in case of a crash, namely, it couples the pulling means pulley with the pulling means stored, e.g. wound, on it to the belt shaft and, after the establishment of the positive connection, effects a retightening motion or retightening rotation of the belt shaft so that the safety belt hugs the body of the person to be secured tightly. Due to this positive connection a very high efficiency is obtained in transforming the kinetic energy released by the power reservoir into the retightening motion. By the same token, there is assurance that the belt shaft is completely separated from the mechanical energy transducer elements prior to an activation of the power reservoir so that completely unimpeded operation of the automatic winder is assured in normal operation. A flexible band or rope of great tensile strength, one end of which is fastened to the pulling means pulley and the other to a power reservoir part which moves in case of activation, such as to a piston of a cylinder/piston drive, is preferably used as pulling means. However, an electromagnetic drive in the form of the armature of an electromagnetic coil, or else a mass disposed in the vehicle and shifting in the crash case, thus exerting a pulling force on the pulling means, may be used as power reservoir.

Preferably used as holdback device are so-called shear elements whose job it is to keep the pulling means pulley in a predetermined position relative to the automatic winder shaft in the normal case, i.e. when the retightener is not activated, said shear elements forming at the same time part of the energy transducer inasmuch as they serve, at the beginning of the rotary motion of the pulling means pulley, as ways for coupling elements along which they are brought into the coupling position.

Common to all known retightener systems is the problem that, at the start of activation, i.e. after activating the power reservoir or a pyrotechnical gas generator, a very steeply rising peak force is developed which then drops very quickly according to the expansion of the pressure gas. This causes very high acceleration forces to act upon the energy transducer elements, especially on the piston and the pulling means due to the steep force/time characteristic, whereby stressing the parts mentioned greatly mechanically and preventing full utilization of the activated kinetic energy, i.e. conversion into the retightening motion so that a high efficiency is not obtained. According to the invention, these difficulties are avoided by having the pulling means led through a bore of the piston and fixed at the piston and pointing in pulling direction or hooked to a piston rod, pointing opposite to the pulling direction. There, the activated kinetic energy of the power reservoir acts first upon a small piston cross-section, the charged piston cross-section being increased stepwise with the piston motion until ultimately the full piston cross-section is subjected to the driving pressure. A time-delayed, gradual and uniform increase of the pulling means pull is thus obtained so that peak loads on these pulling means and on the other energy transducer components are completely avoided with certainty, and so that the kinetic energy of the power reservoir can be converted virtually completely into the rewinding motion of the automatic winder. Not least due to this is the ability to design the retightening drive system lighter, such as by making the piston and the guide of light metal or plastic.

Other advantageous details are evident from the embodiment examples described below and illustrated in the drawings.

Figure 2:
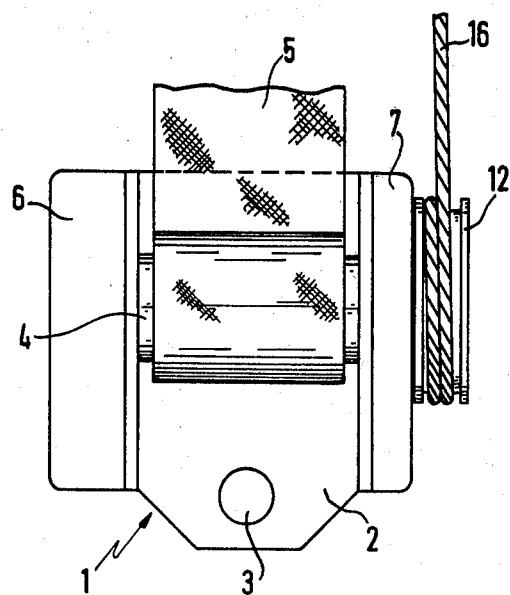
Figure 3:
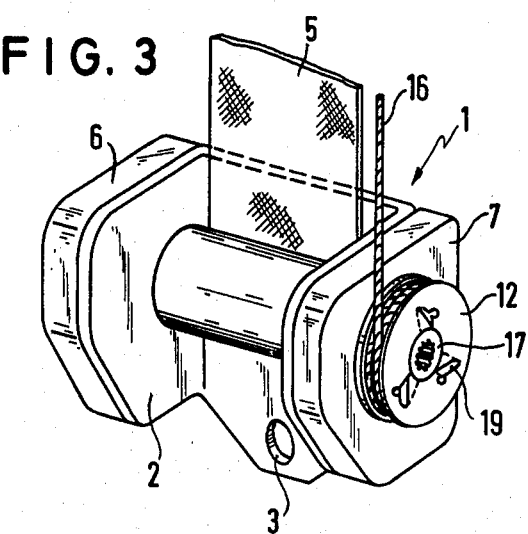
Figure 4:
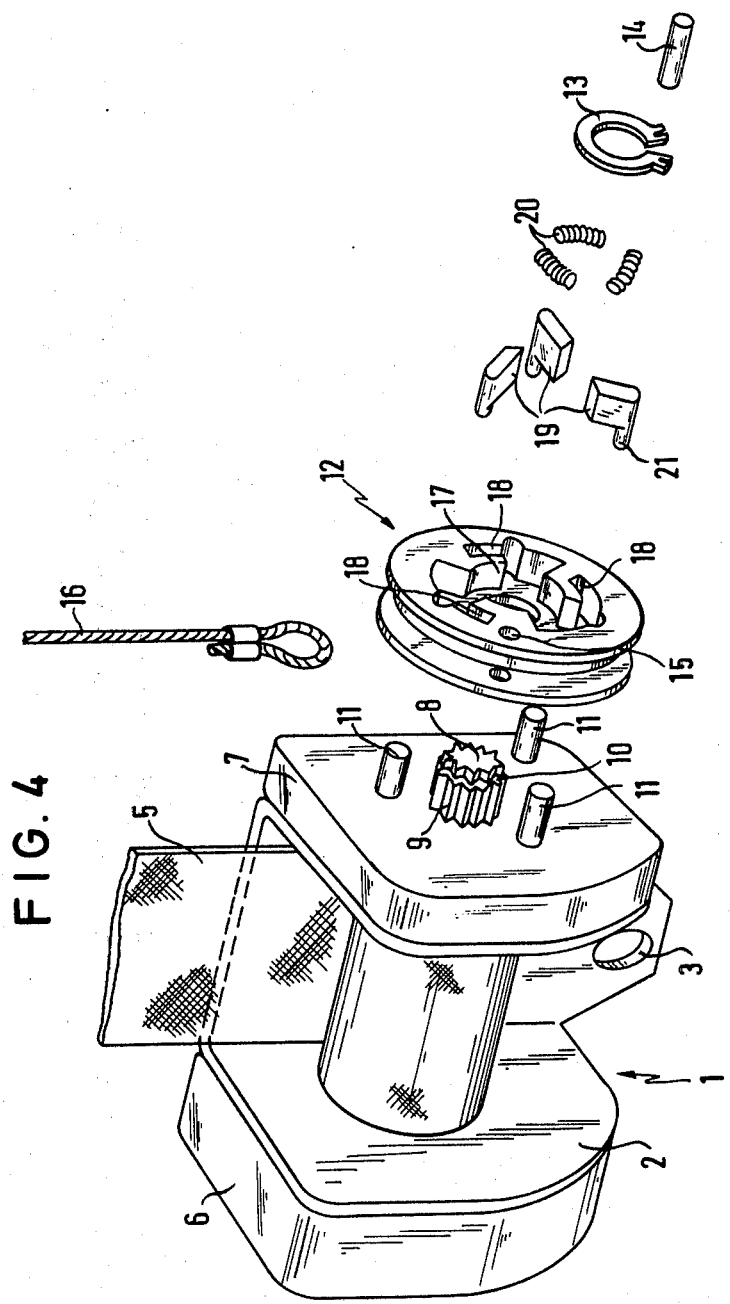
Figure 5:
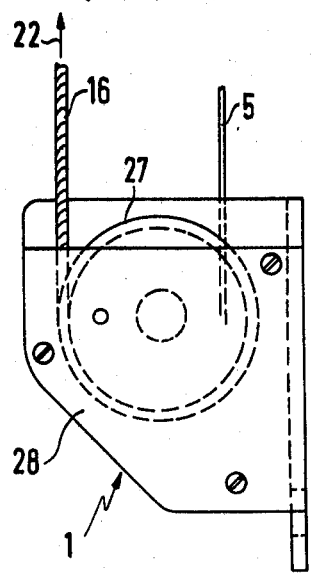
Figure 6:
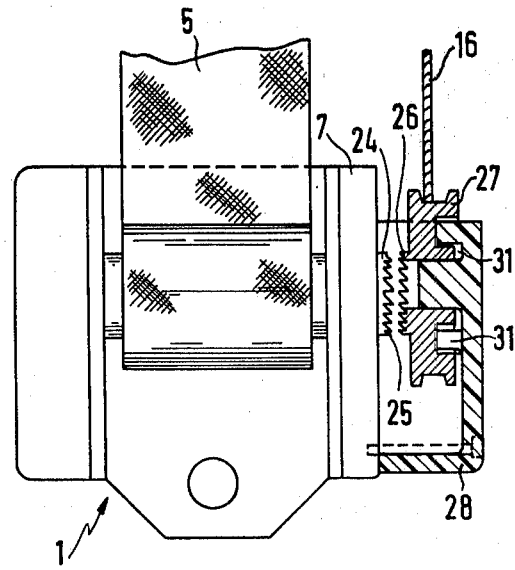
Figure 7:
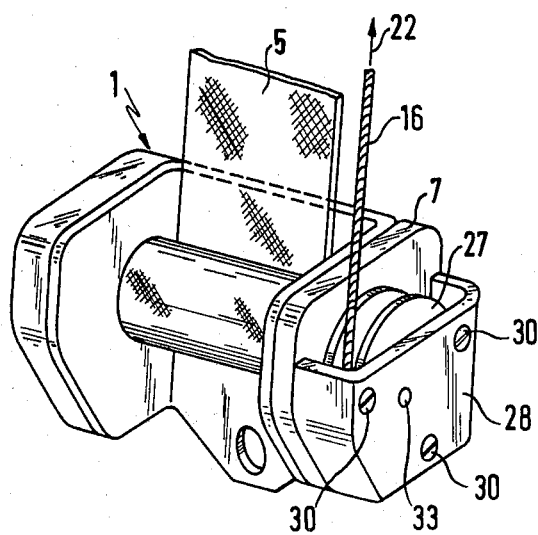

In the embodiment example according to FIGS. 1-4, and automatic safety belt winder has the general designation 1. As a carrying component the automatic winder 1 has a U-shaped housing 2 which can be fastened, e.g. to the frame of a motor vehicle, by means of a hole 3. Rotatably mounted in the housing 2 is a belt shaft 4 on which is wound a belt 5 and whose shaft end on the left in FIGS. 2, 3 and 4 is in positive connection, in known manner, with a release and locking mechanism which self-releases in case of a crash and is covered by a cover 6. The belt shaft 4 is connected in the area of the opposite shaft end to a rewind spring covered by a cover 7. The belt shaft 4 has a shaft extension 8 which projects beyond the rewind spring cover 7 and has radial teeth 9 and a radial incision 10. Furthermore, freely sticking out of the cover 7 are three shear pins 11 to which a pulling means pulley 12 can be attached. In normal operation of the winder, the retaining ring 13, pushed into the incision 10, is axially spaced from the pulling means pulley 12 so that the freewheeling of the belt shaft is not impeded. It is only after activation of the automatic winder, i.e. in case of a crash, for instance, that the retaining ring 13 serves to secure the pulling means pulley 12 axially.

Fastened by means of a pin 14 in a hole 15 of the pulling means pulley 12 designed like a spool is a rope-like pulling means 16 which has a looped end for this purpose. The pulling means 16 is wound on the pulling means pulley 12. The pulling means pulley 12 has a radial cutout 17 enclosing the radial teeth 9 with clearance. Pivotably mounted in three cutouts 18 evenly distributed over the circumference of the pulling means pulley 12 are clutch levers 19 which are pushed by springs 20 into the free-wheeling position which is the position in which the tooth-like lever ends lie clear of the radial teeth 9. The cutouts 18 are designed in the form of slots resembling elongated holes in which the clutch levers 19 equipped with appropriate trunnions 21 are mounted along with the shear pins 11. When the automatic winder locks and upon tension in direction 22 exerted on the pulling means 16, the pulling means pulley 12 pivots in direction 23, whereby the clutch levers 19 are pivoted against the force of the springs 20, striking the shear pins 11 and pushed into the radial teeth 9. As the tension increases, the shear pins 11 are sheared off so that the belt shaft 4 is turned backwards by the clutch connection which represents an energy transducer, and any belt slack present is tightened. The pulling means 16 is driven by a drive, not shown in FIGS. 1-4, which is connected to a power reservoir to be described later.

In the embodiment example according to FIGS. 5-8 there is again provided an automatic safety belt winder designated 1, the belt shaft again being extended beyond the rewind spring cover 7 by a shaft extension 24. The face of the shaft extension 24 has sawtooth-shaped axial teeth 25 which can be coupled to corresponding sawtooth-shaped and axial counterteeth 26 on the pulling means pulley 27. Serving the mounting of the pulling means pulley 27 is a trunnion 29 which is molded on a cup-shaped cover 28 and permanently joined to the automatic winder housing or screwed by screws 30 to the cover 7, the pulling means pulley 27 being axially movable on the trunnion 29. Also molded to the cover 28 in the embodiment example are four cams 31 in the form of curved projections protruding in corresponding recesses 32 with slanted, wedge-shaped strike surfaces in the pulling means pulley 27. 33 is a shear pin which is fixed in the cover 28 and projects into a hole 34 in the pulling means pulley 27, fixing the latter in the inoperative, unactivated position. In this embodiment example, too, the pulling means 16 is connected to the pulling means pulley 27 via a pin 14. Upon tension on the pulling means 16 in direction 22 the shear pin 33 is sheared off, and at the same time the pulling means pulley 27 is moved axially towards the axial teeth 25 via the cams 31 so that a coupling connection of the counterteeth 26 and the axial teeth 25 is established. This couples the belt shaft to the pulling means pulley 27, to the pulling means 16 and to a preceding power reservoir drive. Consequently, the belt 5 is again tightened by turning the belt shaft.

Figure 10:
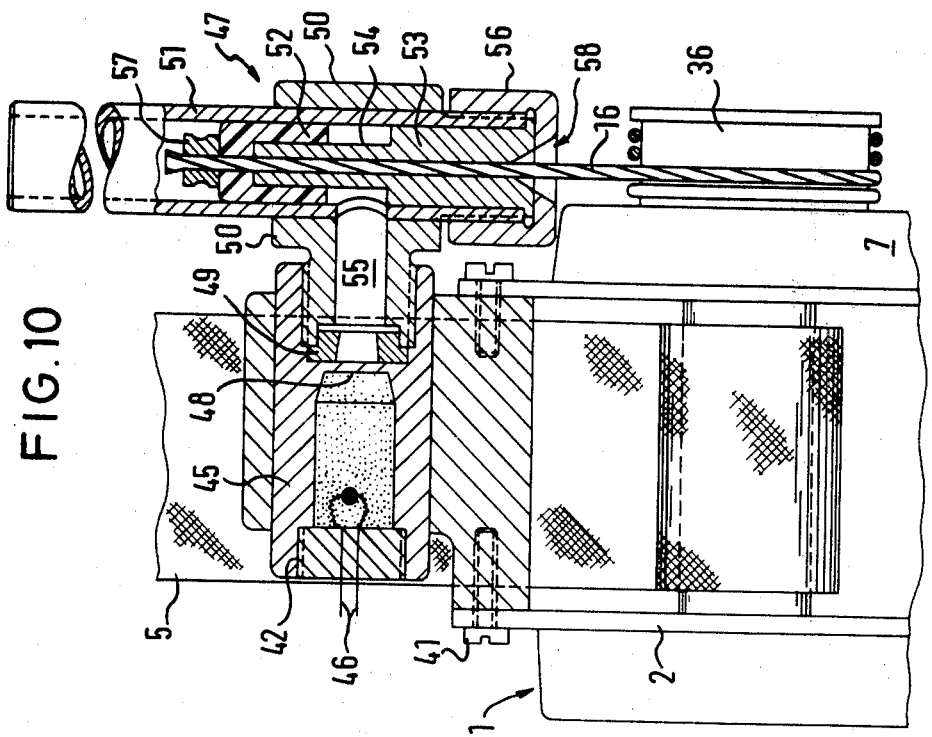
FIGS. 9-11 is a third embodiment of the retightener according to the invention in side view, sectioned view and exploded view, respectively.
Figure 9:
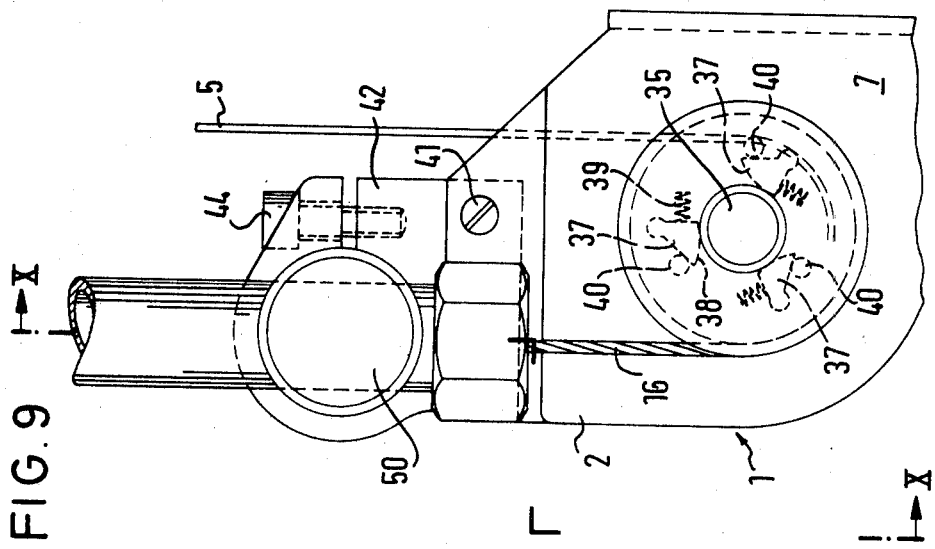
Figure 11:
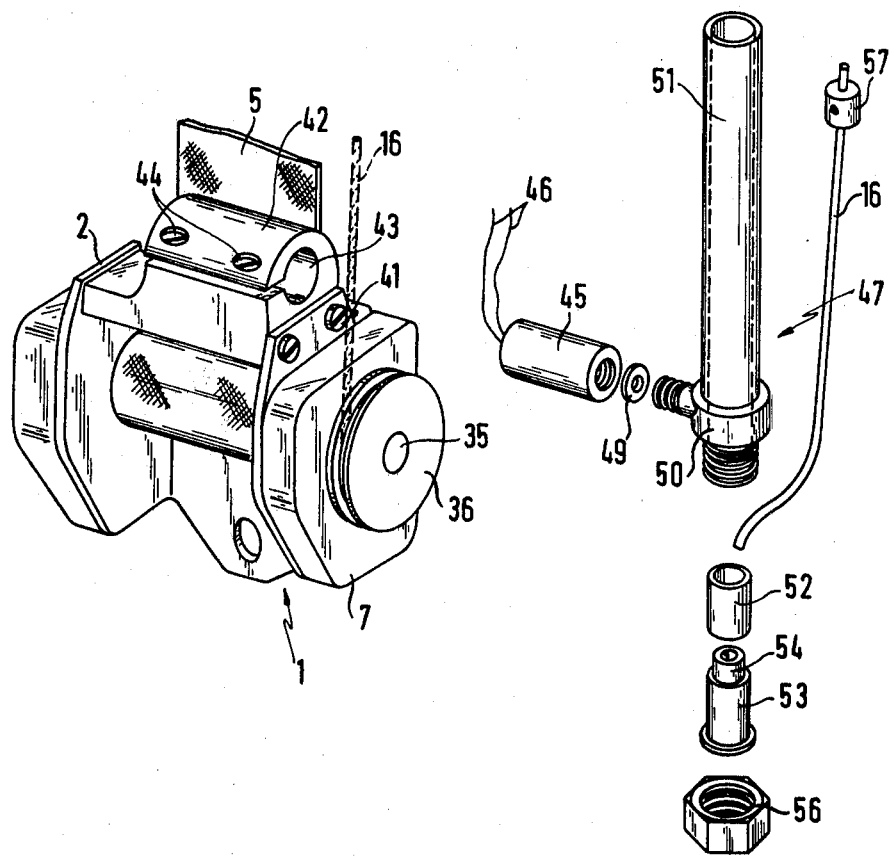

In the embodiment example according to FIGS. 9, 10 and 11, the belt shaft again has an extension 35 which projects beyond the rewind spring cover 7 and whose outside diameter is smooth or slightly roughened. In this embodiment example three clamping levers 37, such as with roughened clamping surfaces 38, are pivoted on the pulling means pulley 36 and are pushed by springs 39 against shear pins 40 fixed to the housing, similar to the preceding embodiment examples. When the pulling means pulley 36 starts its rotary motion, the clamping levers 37 are pushed against the outside diameter of the shaft extension 35 and clamped there. As tension on the pulling means 16 increases, the shear pins 40 shear off so that the belt is retightened. In this embodiment example a seating block 42 is rigidly fastened to the U-shaped housing of the automatic winder by means of screws 41. The seating block 42 has an opening 43 which can be narrowed by tightening screws 44 and serves the purpose of keeping both a power reservoir in the form of a propellant charge cartridge 45 with fuse 46 and the associated cylinder/piston drive 47 in place. The end of the driving side of the cartridge 45 is closed by a bursting or rupture plate 48, followed by a nozzle plate 49 narrowed in wedge shape. An adapter 50 in which a cylinder 51 accommodating a cylindrical piston 52 is mounted can be screwed to the cartridge 45. Also fastened in the cylinder 51 is a guide member 53 on whose reduced extension 54 the piston 52 rests. The reduced extension 54 is located at the lever of the pressure aperture 55 of the cartridge 45 and adapter 50. The piston 52, the guide member 53 and a cap nut 56 which closes and seals the bottom of the cylinder 51 have an axial hole through which the pulling means 16 goes. A crimping part 57 connects the free upper end of the pulling means 16 to the piston 52. Upon activation of the power reservoir or ignition of the propellant charge in the cartridge 45, i.e. in case of a crash, the propellant gases flow into the cylinder 51 through the pressure aperture 55 and act upon the piston 52 which is driven upwardly as shown in FIG. 10. Driven together with the piston 52 is also the pulling means 16 which causes the pulling means pulley 36 to rotate in the above described manner. To take deviations in the relative position of cylinder 51 and pulling means pulley 36 into account, the axial holes in the guide member 53 and cap nut 56 are conically expanded or rounded at 58.

Figure 12:
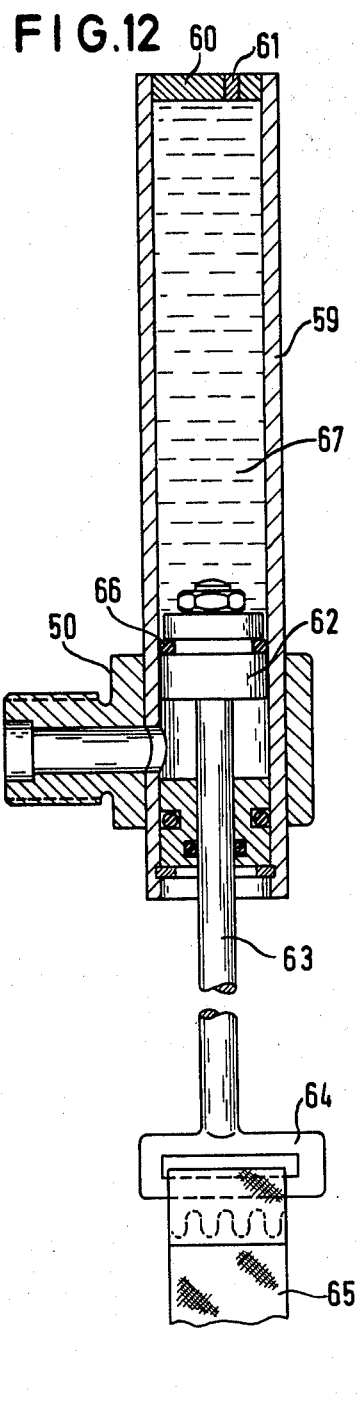
FIG. 12 shows a sectioned view of a cylinder/piston drive system for a pulling means in band forms.

In the embodiment example according to FIG. 12, the cylinder/piston system is additionally damped. The tubular cylinder 59, which may again be connected to the automatic winder housing via an adapter 50, is closed by a bottom 60. The bottom 60 contains a blowout element 61 which tightly closes the cylinder 59 during normal operation of the safety belt system. The piston 62 is connected to a piston rod 63, e.g. by screws, the piston rod 63 having a broadened mounting member 64, a flexible pulling means 65 in band form being suspended from its slot. The piston 62 has a radial, annular sealing element 66. In the cylinder chamber between piston 62 and bottom 60 is a fluid brake medium 67 in liquid or gaseous form. When air, for instance, is used as brake medium, the hole for the blowout element in the bottom 60 may be open and the sealing element 66 may also be omitted. Due to this design of the cylinder/piston drive, the speed with which the pulling means 65 is driven can be appropriately influenced, such as damped.

Figure 13:
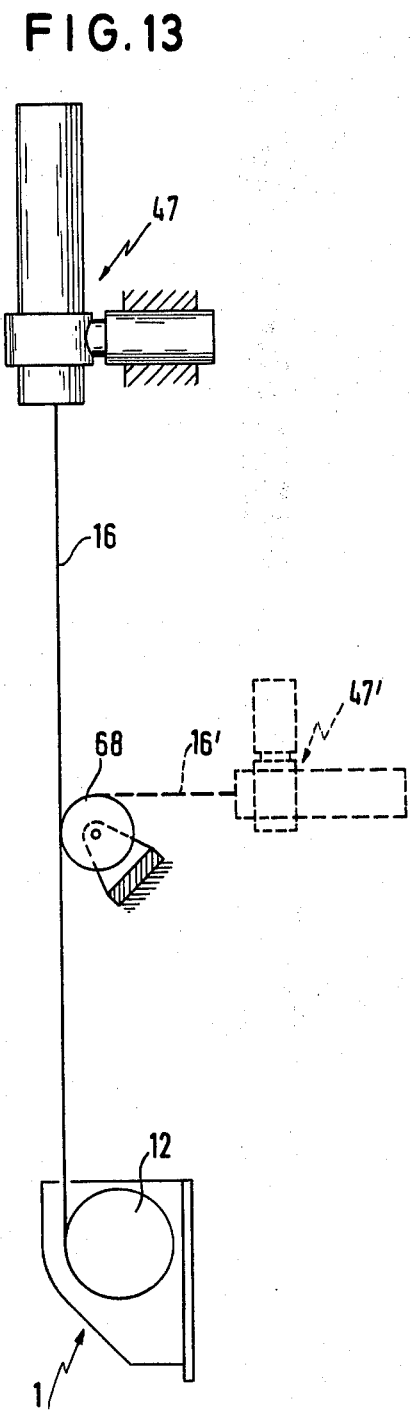
FIG. 13 is another embodiment illustrating a power reservoir disposed remote from the automatic winding.

In the embodiment example according to FIG. 13, a designates generally an automatic safety belt winder with pulling means pulley 12 and 47 designates generally a cylinder/piston drive, the latter being mounted separate from the automatic winder as a separate assembly. A power connection between these two assemblies exists only through the pulling means 16, a straight line of action between the assemblies 1 and 57 existing in the exploded view of the drawing. Due to the provision of a guide roller 68 which may be supported by the housing, the pulling means 16 can be reoriented arbitrarily according to the broken line 16' and positioned anywhere in the vehicle according to the cylinder/piston drive 47'.

In FIG. 14 is sketched schematically a pulling means pulley 69 on which a pulling means 16 is wound. The coupling element for the clutch connection between the pulling means pulley 69 and the essentially smooth outside diameter of the shaft extension 35 of the belt shaft are roller 70, designed in the form of small rings and mounted on and retained by bearing pins 71 fixed to the housing during normal operation of the safety belt system. The bearing pins 71 are again designed as shear pins, i.e. they shear off when a pull of sufficient magnitude is exerted on the pulling means 16 in direction 72. The pulling means pulley 69 has inclined ways 73 in the form of wedge-shaped cutouts in it, approaching the roller axis in the wedge shape. Due to the rollers 70 being mounted to bearing pins 71 formed, for example, on the cover 7 of the automatic winder housing, they are kept in the ways 73 in a position in which they are spaced from the outside diameter of the shaft extension 35 by the distance a so that complete freewheeling of the belt shaft is assured. Upon increased tension on the pulling means 16 in direction 72 the bearing pins 71 are sheared off in the manner described, whereupon the rollers 70 are moved by the springs 74 along the inclined ways 73 in the direction towards the pulley axis until they contact the outside diameter of the shaft extension 35.

When further force is exerted, the rollers 70 are clamped between the ways 73 and the outside diameter of the shaft extension 35 so that the latter, and with it the belt shaft, are taken along in a rotary backwards direction, associated with a retightening effect on the belt.

The coupling principle according to FIG. 14 is made use of in the embodiment example according to FIGS. 14A to 14D. Here, the pulling means 16 is again wound on a pulling means pulley 69' of spoollike design, this pulling means pulley 69' having an essentially tangential hole or slot 109 in which the free pulling means end is inserted. As may be seen from the sectioned views of FIGS. 14A to 14C, a tapped hole 110 which crosses the first mentioned hole 109 and in which a headless screw 111 is screwed, runs perpendicular to the hole 109 in the pulling means pulley 69', said threaded pin 111 squeezing the pulling means end in the intersection of hole 109 and tapped hole 110, thus connecting it strongly to the pulling means pulley 69'.

From FIGS. 14A to 14D follows further a particularly advantageous, inventive embodiment and configuration of the components responsible for the clutch connection between pulling means pulley 69' and shaft extension 35'. It may be seen that the shaft end 35' has a circumferential spline 112, on which is mounted or pressed an intermediate bushing 113. The intermediate bushing 113, having an essentially smooth outside diameter, is hubshaped in design and has, as an integral part, a face flange 114 with counterbored axial hole 115. By means of a screw 116 the intermediate bushing 113 with face flange 114 is screwed to the shaft end 35', the latter having a tapped hole for screw 116 for this purpose. In normal operation of the automatic winder the face flange 114 is a short distance apart from the outer face of the pulling means pulley 69'. In normal operation of the automatic winder the pulling means pulley 69' is fixed on bearing pins 71' which in turn serve as trunnions for the rollers 70 and are molded in the form of thin, preferably plastic pins to the cover 7. Designated 71" is an additional shear pin which is also molded to the cover 7 and determines the holdback force for the pulling means pulley 69'. The free end of the shear pin 71" is preferably deformed or welded after assembly of the pulling means pulley 69' as FIG. 14B shows. The pulling means pulley 69' is provided with a hole 117 to accommodate the shear pin 71". In normal operation of the automatic winder the rollers 70 are at the ends or in the corners of the ways 73' furthest away from the axis of rotation and see to it that the pulling means pulley 69' is centered relative to the shaft end 35' so that there is always a certain minimum spacing between the rollers 70 and the outside diameter of the intermediate bushing 113. Upon the activation of the retightening system, i.e. after tension on the pulling means 16 and after the action of a torque on the pulling means pulley 69', the bearing pins 71' will first deform elastically and subsequently shear off, including the shear pin 71" which determines the rest and centered position of the pulling means pulley 69' relative to the shaft end 35'. Due to mass inertia upon acceleration in direction 118 on the pulling means 16, an immediate coupling of the pulling means pulley 69' and the intermediate bushing 113 takes place in that the rollers 70 slide along the ways 73' and contact the outside diameter of the intermediate bushing 113. In this procedure, the face flange 114 of the intermediate bushing 113 acts as axial safety for the pulling means pulley 69'.

In broad agreement with the coupling principle according to FIG. 14 there is disposed, in the embodiment example according to FIGS. 14E to 14H, lateral to the sideplate 2' of a U-shaped automatic winder housing 2, a pulling means pulley 169 of Z-section which is rotatably mounted to the belt shaft extension 135 projecting beyond the sideplate 2'. The outside diameter of the pulling means pulley 169 is again profiled like a pulley on which the pulling means 16 are wound and fastened in the hole 209. Three cutouts, forming ways 173 inclined towards the pulley axis, are distributed over the circumference of a bearing bore 120 larger in diameter than the outside diameter of the shaft extension 135. Located between the circumference of the bearing bore 120 and the shaft extension 135 is a bushinglike cage 121 of thermoplastic material which is provided with three windowlike openings 122, distributed in the same manner as the ways 173 and retaining rollers 123. As FIG. 14G shows, the cage 121 has thin, springy tabs 124 which project into the openings 122 under a preload and which push the rollers 123 radially outward against the offset annular ringwall of the pulling means pulley 169. In the absence of such tabs, the outline of each opening 122 is then somewhat smaller than that of the roller 123 so that the rollers are retained in an outer release position in this manner.

The cage 121 has three axis-parallel, luglike shear elements 125, mounted in three corresponding openings 126 of the sideplate 2' and connecting the pulling means pulley 169 to the automatic winder housing secure against rotation up to a predetermined torque or shear moment. The pulling means pulley 169 is again connected to the sideplate 2' by means of a shear pin 171 in shear pinhole 171', secure against rotation up to a limited torque. Adjacent to the shaft extension 135 the belt shaft has a thinner shaft extension 127 with driver slot 128 on which a belt rewind spring 129 is mounted and retained. Pulling means pulley 169 and rewind spring 129 are enclosed by a cover 130 with an intermediate bottom 131 between rewind spring and pulling means pulley.

In case of activation, i.e. when a sudden pull in direction A occurs on the pulling means 16, a torque acts upon the pulling means pulley 169, leading to the shearing off of the shear pin 171. This causes a relative motion to take place between the cage 121 and the pulling means pulley 169, and the rollers 123 are moved along the ways 173 out of their rest or release position in the cage in the direction towards the pulley axis until contact, i.e. positive, force-transmitting contact with the shaft extension 135 is established. Now the shear elements 125 are sheared off, thus initiating the retightening process.

In the schematically shown embodiment example according to FIG. 15 there is provided as power reservoir and drive mechanism for the pulling means 16, which may be fastened to a pulling means pulley such as 69, an electromagnet 75, the free end of the pulling means again being connected to the magnet core 76 of the electomagnet 75 by crimping. Upon activation of the magnet coil 77 via the electric leads 78 the magnet core 76 moves in arrow direction, thereby effecting a rotation of the pulling means pulley 69 and retightening of the safety belt in the manner described above.

In the embodiment example according to FIG. 16 there is provided as power reservoir a mass 79 which may be guided, for example, in horizontal ways 80 so as to be horizontally movable in the forward area of the motor vehicle 81. A relative motion of mass 79 occurs in the case of a crash, for instance. The mass will then move in direction 82 so that the pulling means 16 fastened to the mass 79 causes a pulling means pulley such as 69 to rotate, in conjunction with a retightening of the safety belt 5 in the direction if the arrow.

The embodiment example according to FIG. 17 makes clear in a schematic representation another alternative of a power reservoir in connection with a cylinder/piston drive such as 47. Here, a pressure medium reservoir 83, communicating with the cylinder/piston drive 47 through a tubular outlet 84, is used as power reservoir. Provided in the area of the outlet 84 is a valve 85 which can be operated or put in the open position in a manner known per se either electromagnetically or pyrotechnically. 86 are the electric leads to the protected valve 85. Instead of an electromagnetically operable valve there is also the possibility of providing a small pyrotechnic propellant charge which opens the valve on the pressure reservoir 83 in the case of danger, thus causing a pull on the pulling means 16, a rotation of the pulling means pulley, e.g. 69 and, consequently, the retightening effect.

Figure 18:
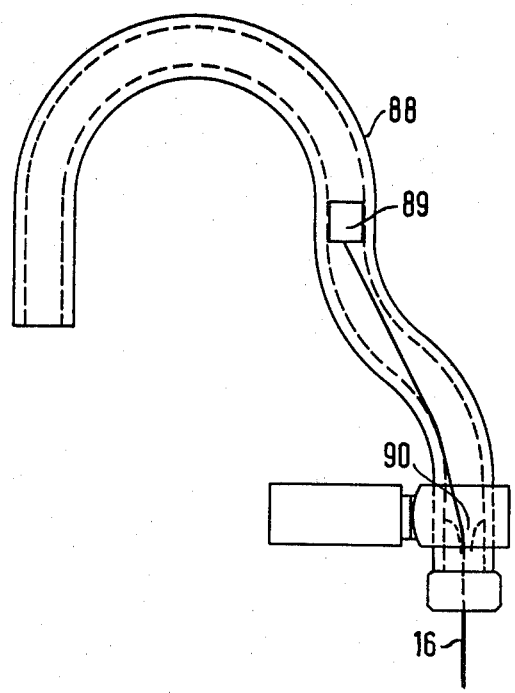
FIG. 18 is a special embodiment of a power reservoir drive with curved cylinder.

In a variation from the above described cylinder designs, a cylinder/piston drive 87 for the pulling means 16 is provided in the embodiment example according to FIG. 18, in which the cylinder 88 has several bends in accordance with the assembly space available in the motor vehicle. The cylinder 88 contains a piston 89 consisting, for example, of a ductile material, capable of adapting to the curved cylinder area. The flexible pulling means in the form of a rope or band is also capable of following the curves in the cylinder 88, the outlet side at 90 being flared to prevent increased friction of the pulling means 16.

Figure 19:
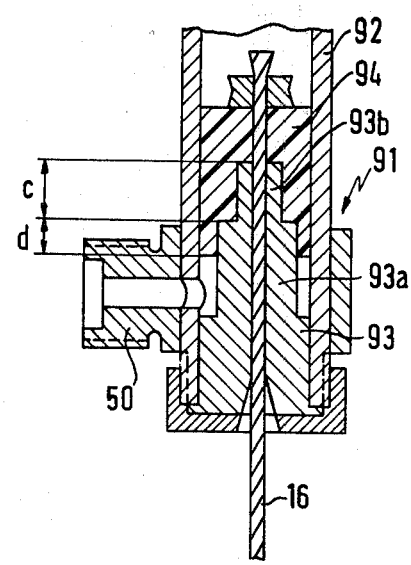
FIG. 19 is another variant of a cylinder/piston drive in multiphase design.

FIG. 19 shows a cylinder/piston drive 91 which may also communicate, such as via an adapter 50, with a power reservoir, not shown, of the above described type. Fixed in the cylinder 92 is a guide 93 shose diameter is reduced to provide in three stages of increasing piston area in the embodiment example so that it has as integral parts two guide extensions 93a and 93b reduced in diameter. The guide 93 serves to guide a piston 94, likewise with repeatedly stepped diameters and with bore sections corresponding to the lengths c and d of different diameters fitting the diameters of the guide 93. In its position at rest the piston 94 rests fully on the guide 93, with only the small, annular section of the lowest bore section of the piston 94 facing the inlet opening of the adapter 50 which communicates with the power reservoir. When triggering the power reservoir, i.e. at the start of the piston motion, only the lowermost, annular section of the piston 94 becomes pressurized, as mentioned, until the second annular section of the piston 94 also becomes free and is pressurized after the piston 94 has lifted off the guide 93 and traversed the distance d. Thus, a larger cross-sectional area of the piston is exposed to the gas pressure. Finally, after traversing the distance c, the last cross-sectional area of the piston 94, the uppermost one in FIG. 19, is freed of the guide 93 so that the entire piston section is now pressurized in this last stage. It is possible to reduce or graduate in this manner the strong initial forces which would otherwise act upon the drive system using normal pistons so that no extreme peak loads become effective on the piston and, hence, also on the pulling means 16, which again runs through axial holes in the guide 93 and piston 94 and is attached to the piston by crimping. This provides the means to design the drive system with inexpensive and lightweight construction because extreme forces are avoided. It goes without saying that the number of shoulders can be appropriately varied.

Figure 20A:
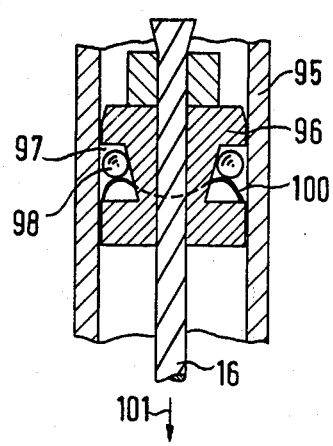
FIGS. 20A and 20B are two different piston designs of a cylinder/piston drive with locking action.
Figure 20B:
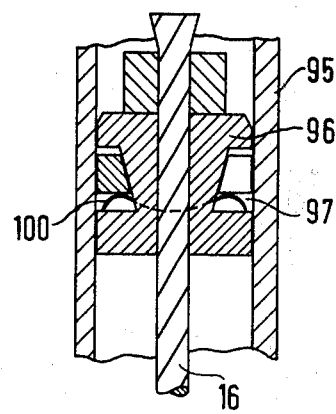

FIGS. 20A and 20B show details of a cylinder/piston drive roughly corresponding to the embodiment example according to FIG. 10. Here, an essentially cylindrical piston 96, connected to a pulling means 16 in rope or band form as described, is guided in a tubular cylinder 95. In this embodiment the piston 96 is provided, in the area between its two faces, with a tapered section 97 in which either rollers 98 (FIG. 20A) or a ring-like clamping member 99 (FIG. 20B) are mounted so as to be axially movable countering the force of a spring 100 in the form of a formed spring. In the inoperative position of the piston 96 the rollers 98 or the clamping member 99 are pushed towards the narrowed section end by the force of the spring 100 so that a clamping action between piston 96 and cylinder 95 takes place. When the piston 96 starts moving, e.g. after triggering the associated power reservoir, the elements 98 or 99 are moved into the release position counter to the force of the spring 100, in which position free motion of the piston 96 is no longer impeded. When the pressure is relieved, a load reversal in direction 101 takes place on the pulling means 16, and the parts 98 and 99, respectively, make contact with both the outside of the taper and the I.D. of the cylinder 95, again clamping the piston 96. In this way, a retightening system can be designed with simple components, no longer requiring additional locking or holdback means.

Figure 21:
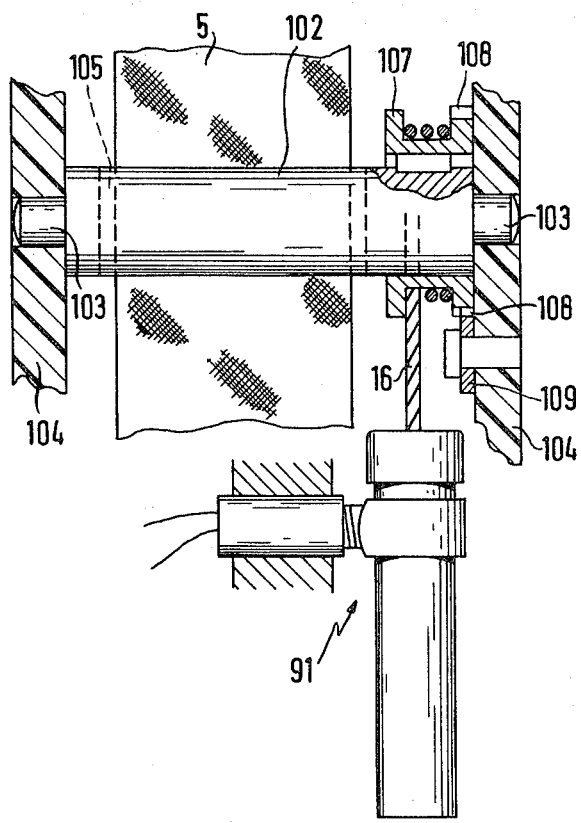
FIGS. 21-23 is a further embodiment of a retightener according to the invention for automatic safety belt winders with rotatable retightener shaft in sectioned side view and sectioned top view.
Figure 22:
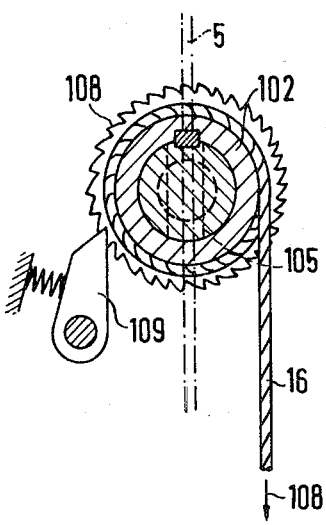
Figure 23:
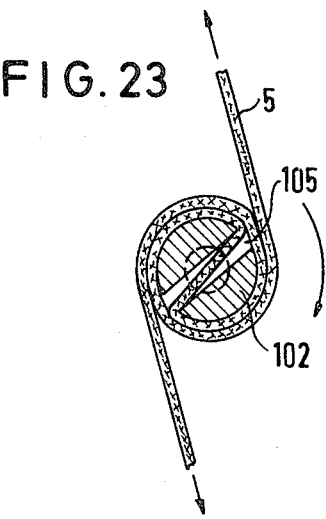

In the embodiment example according to FIGS. 21 to 23 there is mounted in the course of the belt 5, e.g. in the area between an automatic safety belt winder not shown and a deflecting fitting, a retightener shaft 102 by means of a bearing pin 103 rotatably mounted in a fitting 104 fixed to the vehicle. The retightener shaft 102 has a radial slot 105, through which the belt 5 is led without causing friction and without making contact, as FIG. 23 shows in particular. Due to a driving key there corotates with the retightener shaft 102 a spoollike pulling means drum 107, on which is wound, for example, a pulling means 16 in rope form. The free end of the pulling means again is attached to the piston of a cylinder/piston drive of the kind described, such as 91. Upon the activation of the cylinder/piston drive 91 the pulling means 16 is pulled in direction 108 according to FIG. 22, thereby rotating the retightener shaft 102 and winding up the belt 5, as made clear in FIG. 23. In the end position, the piston of the cylinder/piston drive 91 could have a locking mechanism so that no back rotation can occur under load. In the embodiment example according to FIGS. 21 and 22, however, there is fixed to the retightener shaft 102 a gear 108, such as one formed by cutting teeth into the outer spool collar of the pulling means drum 107 to interact with a spring-loaded pawl 109 so that while a retightening motion of the retightener shaft 102 is possible, a backwards rotation of this shaft is not.

There is claimed:

1. In a retightener for an automatic safety belt roll-up device having a winder mounted on a belt shaft and biasing means for biasing the winder in a belt retraction direction, and with a power reservoir which can be triggered in case of a crash and with an energy transducer which acts upon the belt shaft of the automatic winder after triggering the power reservoir, causing the automatic winder to perform a rotary retightening motion, the combination therewith wherein
(a) said energy transducer is a rotatable pulling means pulley,
(b) coupling means for coupling the rotatable pulling means pulley with the belt shaft, for performing the rotary retightening motion after triggering the power reservoir,
(c) flexible pulling means connecting the pulley to the power reservoir to impart energy from the power reservoir to energize the pulley to effect both the coupling connection with the belt shaft and the retightening motion of the belt shaft after triggering the power reservoir, and
(d) holdback means to restrain said rotatable pulling means pulley from forming said coupling connection until said power reservoir is triggered.

2. Retightener according to claim 1, wherein the pulling means is a flexible band or rope.

3. Retightener according to claim 2, wherein the band or rope consists of a high tensile strength material.

4. Retightener according to claim 1, wherein said belt shaft is rotatably supported in a housing of said automatic winder, and wherein said belt shaft has a shaft extension which projects beyond said automatic winder housing and can be coupled there to said pulling means pulley.

5. Retightener according to claim 4, wherein said shaft extension is a projection of the belt shaft with radial teeth for coupling the pulling means pulley to the belt shaft.

6. Retightener according to claim 4, wherein said shaft extension is a projection of the belt shaft with axial teeth for coupling the pulling means pulley to the belt shaft.

7. Retightener according to claim 1, wherein the pulling means pulley is in engagement with a clamping mechanism which when activated by rotation of the pulley couples the pulley to the belt shaft.

8. Retightener according to claim 1, wherein the pulling means pulley is in engagement with rollers which when activated by rotation of the pulley couples the pulley to the belt shaft.

9. Retightener according to claim 5, wherein at least one coupling lever is pivoted on the pulling means pulley and spaced by the force of a spring from the radial teeth, and wherein shear pins are fixed to the housing, and wherein said coupling lever is disposed against said shear pins and upon rotation of the pulley counters the spring force, shears the pins and pushes into the radial teeth in coupling fashion.

10. Retightener according to claim 9, wherein said shear pins keeping the coupling and the pulling means pulley in the inoperative position and shearing off under the action of a pulling force on the pulling means, releasing the coupling levers and the pulling means pulley, are lugs fixed to the housing.

11. Retightener according to claim 6, wherein said pulling means pulley has an axial countergear which can interact with said axial teeth of the belt shaft, said pulling means pulley being axially movable on a bearing shaft, cams fixed to the housing, such that when a pulling force acts upon the pulling means the pulling means pulley strikes the cams and is shifted axially, whereby the countergear engages the coupling teeth.

12. Retightener according to claim 11, wherein said pulling means pulley is fixed in the inoperative position by a shear pin.

13. Retightener according to claim 11 or claim 12, wherein said pulling means pulley is enclosed by a cup-shaped cover fixed to the housing, to which the bearing shaft, the cams and the shear pin are attached.

14. Retightener according to claim 7, wherein the clamping mechanism comprises clamping levers pivoted on the pulling means pulley, said levers kept away from the outside diameter of the shaft by a spring which exerts a force and strike lugs countering the spring force, and when said pulling means pulley is rotated, said levers are pushed in clamping fashion against the peripheral surface of the shaft.

15. Retightener according to claim 3, wherein mounted on the pulling means pulley are bearing pins which shear off when a pulling force acts upon the pulling means, and wherein rollers are distributed in openings having wedge-shaped ways in the pulling means pulley over the circumference of the shaft and are kept clear of the circumference in release position and, upon activation of the pulley causing it to rotate, the rollers are pushed against the ways in said openings and, after the bearing pins have sheared off, with continued rotation of the pulley, the rollers are brought along the ways into contact with the circumference of the shaft to turn the belt shaft.

16. Retightener according to claim 8, wherein the pulling means pulley includes openings having inclined ways which approach the pulley axis, wherein said rollers are mounted in said openings and are distributed over the circumference of the shaft and are retained in a ringlike and at least partly ductile cage in a release position, and wherein the cage is retained secure against rotation by means of shear elements, and wherein rotation of the pulling means pulley causes coupling contact between the rollers pushed towards the pulley axis and the shaft and shearing of the shear elements.

17. Retightener according to claim 16, wherein the ringlike cage has windowlike openings distributed over its circumference for the rollers, into which windowlike openings protrude springlike tabs which push the rollers into the release position.

18. Retightener according to claim 16 or claim 17, wherein shear elements are distributed over the circumference of the cage, axis-parallel to the cage axis, by means of which shear elements the cage is mounted to a sideplate of the automatic safety belt winder housing.

19. Retightener according to claim 16 or claim 17, wherein the shaft extends beyond the pulling means pulley and is coupled to said biasing means which is in the form of a rewind spring disposed nxt to the pulling means pulley inside a cover covering the rewind spring.

20. Retightener according to claim 1, wherein said power reservoir comprises a cylinder and a piston movable in said cylinder, said pulling means being attached to said piston, the peripheral suface of said piston including a reduced, tapered section in which is mounted at least one axially movable clamping member in the form of a roller which is pushed by the force of a spring into the clamping position at the end of the reduced section where it is in contact with the inside surface of the cylinder, said roller being shifted into the release position counter to the spring force when the piston is moved in pulling direction.

21. Retightener according to claim 1, wherein the power reservoir comprises a cylinder and a piston movable therein for driving the pulling means.

22. Retightener according to claim 1, wherein the power reservoir comprises a pyrotechnical gas generator.

23. Retightener according to claim 21, wherein one end of the pulling means is fastened to the pulling means pulley and the other to the piston of the cylinder/piston drive.

24. Retightener according to claim 22, wherein said power reservoir comprises a cylinder and a piston movable in the cyliner by the gas of said generator for driving said pulling means, and wherein one end of the pulling means is fastened to the pulling means pulley and the other to the piston of the cylinder/piston drive.

25. Retightener according to claim 23, wherein the pulling means is led through a bore of the piston and fixed at the piston end pointing in pulling direction.

26. Retightener according to claim 24, wherein the pulling means is led through a bore of the piston and fixed at the piston end pointing in pulling direction.

27. Retightener according to claim 23 or claim 24 or claim 25 or claim 26, wherein the piston is at least partly open in the direction of the pressure action.

28. Retightener according to claim 23, wherein the cylinder has a nozzle aperture at its end located in pressure action direction.

29. Retightener according to claim 24, wherein the cylinder has a nozzle aperture at its end located in pressure action direction.

30. Retightener according to claim 25, wherein the cylinder has a nozzle aperture at its end located in pressure action direction.

31. Retightener according to claim 26, wherein the cylinder has a nozzle aperture at its end located in pressure action direction.

32. Retightener according to claim 23, wherein the cylinder end located in pressure action direction is closed by a bottom which will burst.

33. Retightener according to claim 24, wherein the cylinder end located in pressure action direction is closed by a bottom which will burst.

34. Retightener according to claim 25, wherein the cylinder end located in pressure action direction is closed by a bottom which will burst.

35. Retightener according to claim 26, wherein the cylinder end located in pressure action direction is closed by a bottom which will burst.

36. Retightener according to claim 28 or claim 32, wherein the front cylinder chamber in pressure action direction is filled with a brake fluid.

37. Retightener according to claim 23 or claim 24 or claim 25 or claim 26, wherein the piston rests on a guide fixedly disposed in the cylinder and having one or more guide sections reduced in diameter and just as many bore sections in the piston likewise reduced in diameter correspondingly so that only a part of the cross-sectional area of the piston is subjected to the pressure at the beginning of the pressure action, with the rest of the cross-sectional piston area being subjected to the pressure as the piston moves a distance to expose an increased cross-sectional area of the piston.

38. Retightener according to claim 23 or claim 24, wherein both piston and cylinder are formed of a light metal.

39. Retightener according to claim 1, wherein the power reservoir is a pressure medium reservoir with a valve which can be shifted into the open position by pyrotechnic actuating elements.

40. Retightener according to claim 4, wherein the power reservoir is detachably fastened to the automatic winder housing.

41. Retightener according to claim 1, wherein the power reservoir is disposed remote from the automatic winder housing as a separate assembly, and wherein the pulling means are connected between the pulling means pulley and the power reservoir.

42. Retightener according to claim 1, wherein said power reservoir comprises an electrically operable drive mechanism for the pulling means, said drive mechanism comprising an electromagnetic device in which the magnet core thereof drives the pulling means.

43. Retightener according to claim 1, wherein the power reservoir comprises a mass, relatively shiftable in the vehicle in the event of a vehicle deceleration exceeding a predetermined amount.

44. Retightener according to claim 21, wherein the cylinder of the cylinder/piston drive for the pulling means is bent in its axial course.

45. Retightener according to claim 1, wherein the free end of the pulling means is firmly connected to the pulling means pulley by a squeeze connection.

46. Retightener according to claim 45, wherein the firm connection is made by a threaded pin engaging a hole or slot in the pulling means pulley occupied by the pulling means end.

47. The retightener according to claim 21, wherein the power reservoir further includes pneumatic means for operating said piston.

48. The retightener according to claim 21, wherein the power reservoir further includes hydraulic means for operaing said piston.

49. The retightener according to claim 23 or 24, wherein the piston includes a piston rod pointing opposite to the pulley direction, said pulling means being hooked to said piston rod.

50. The retightener according to claim 23 or claim 24 wherein both piston and cylinder are formed of plastic.

* * * * *